(No Model.) 5 Sheets—Sheet 1.
F. W. TUERK, Jr.
WATER MOTOR.
No. 400,610. Patented Apr. 2, 1889.
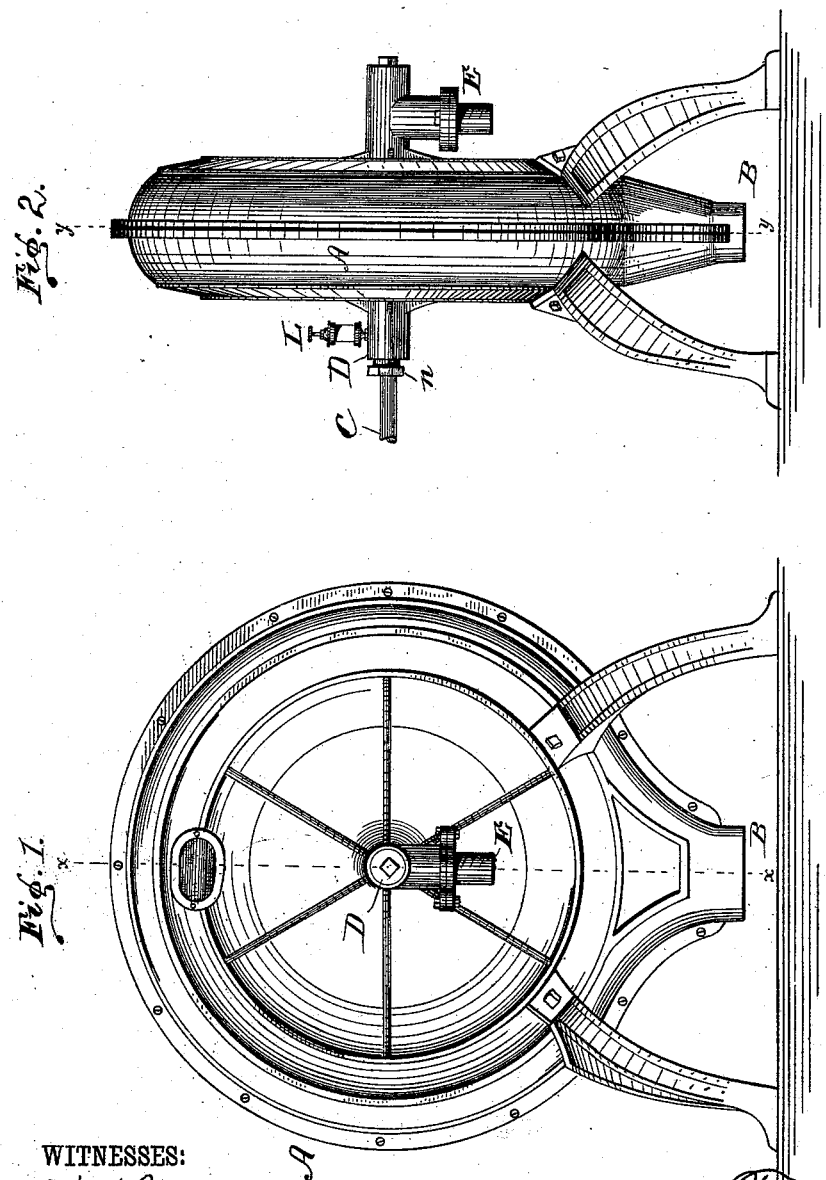
WITNESSES:
INVENTOR,
BY
ATTORNEYS.

(No Model.)

F. W. TUERK, Jr
WATER MOTOR.

No. 400,610. Patented Apr. 2, 1889.

5 Sheets—Sheet 2.

WITNESSES:

INVENTOR
Frederick W. Tuerk Jr
BY
ATTORNEYS.

(No Model.)

F. W. TUERK, Jr.
WATER MOTOR.

5 Sheets—Sheet 3.

No. 400,610.

Patented Apr. 2, 1889.

WITNESSES:
C. W. H. Brown.
A. E. Parsons.

INVENTOR
Frederick W. Tuerk Jr.
BY
N. Eyt Gibbs
ATTORNEYS.

(No Model.) 5 Sheets—Sheet 4.
F. W. TUERK, Jr.
WATER MOTOR.
No. 400,610. Patented Apr. 2, 1889.
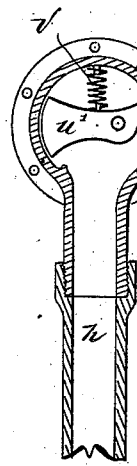
Fig. 5.
Fig. 6.
Fig. 8.
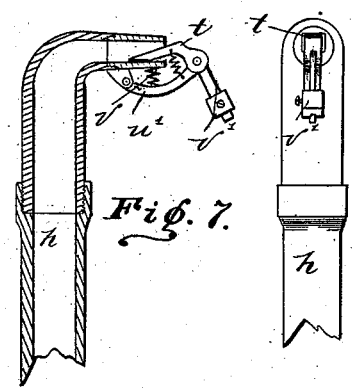
Fig. 7.
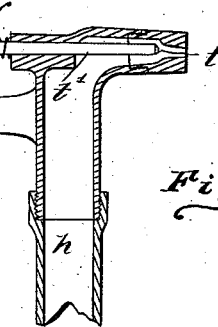
Fig. 9.
Fig. 10.
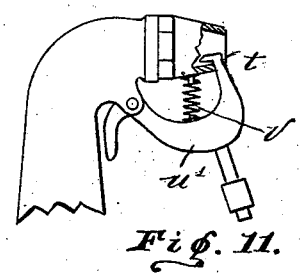
Fig. 11.
Attest:
C. W. H. Brown.
A. E. Parsons.
Inventor:
Frederick W. Tuerk Jr.
per Hey & Leibb
Attorneys.

(No Model.)

F. W. TUERK, Jr.
WATER MOTOR.

No. 400,610. Patented Apr. 2, 1889.

WITNESSES
C. Bendixou
H. P. Denison

INVENTOR
Frederick W. Tuerk Jr.
BY
Duell, Laass & Duell
ATTORNEYS.

UNITED STATES PATENT OFFICE.

FREDERICK W. TUERK, JR., OF SYRACUSE, NEW YORK, ASSIGNOR OF TWO-THIRDS TO JAMES C. HUNTER, OF SAME PLACE, AND JOHN HUNTER, OF STERLING VALLEY, NEW YORK.

WATER-MOTOR.

SPECIFICATION forming part of Letters Patent No. 400,610, dated April 2, 1889.

Application filed January 8, 1887. Serial No. 223,728. (No model.)

*To all whom it may concern:*

Be it known that I, FREDERICK W. TUERK, Jr., of Syracuse, in the county of Onondaga, in the State of New York, have invented new and useful Improvements in Water-Motors, of which the following, taken in connection with the accompanying drawings, is a full, clear, and exact description.

This invention relates to the class of water-motors in which are comprised an annular case having a water-inlet in the center of its side and a wheel journaled in said case having a hollow hub, the hub being provided with an axle-port communicating with the water-inlet in the case, and the spokes of the wheel consisting of hollow radial arms or water-passages extending from the cavity of the hub to the free end of the spokes.

My invention embraces improvements in the construction of the motor-case, in the fittings of the wheel therein, in the valves applied to the hollow arms of the wheel, and in the induction-port by which the water enters the case; and it consists in the several novel features of construction and new combinations of parts, hereinafter so fully described, and definitely pointed out in the claims, as to need no further preliminary description.

In specifying my invention, reference is had to the accompanying drawings, forming a part of this specification, in which like letters indicate corresponding parts in all the figures.

Figure 3:
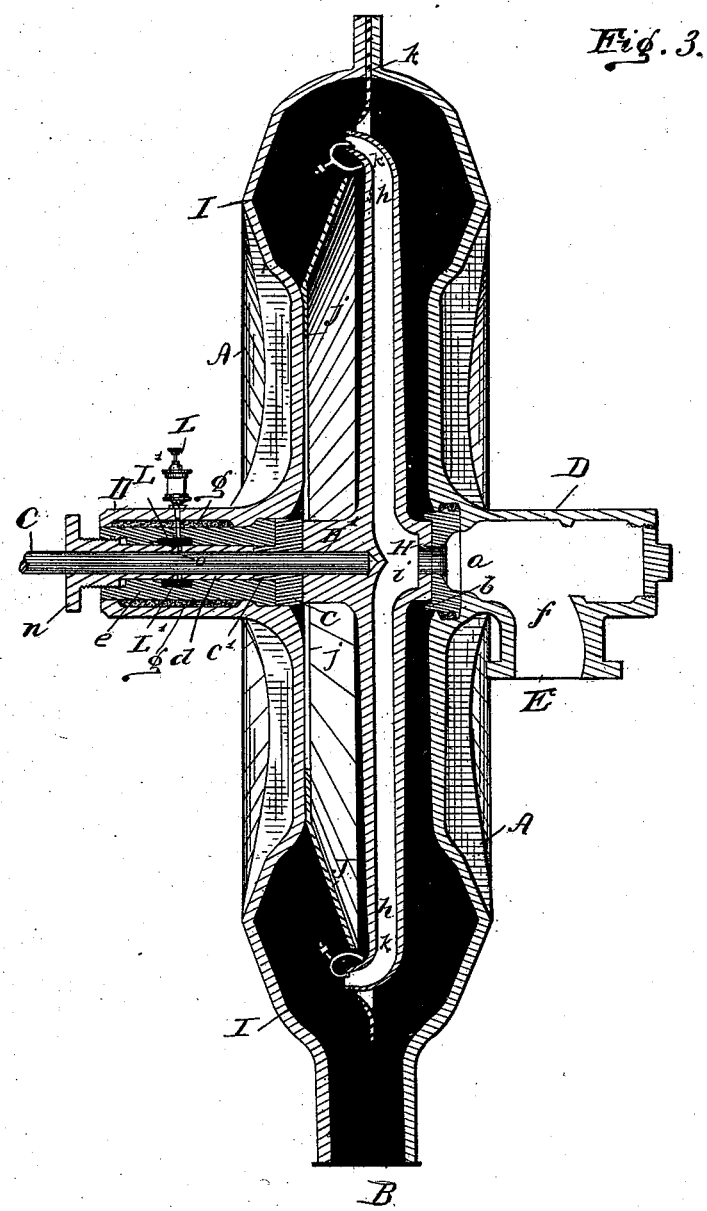
Figure 4:
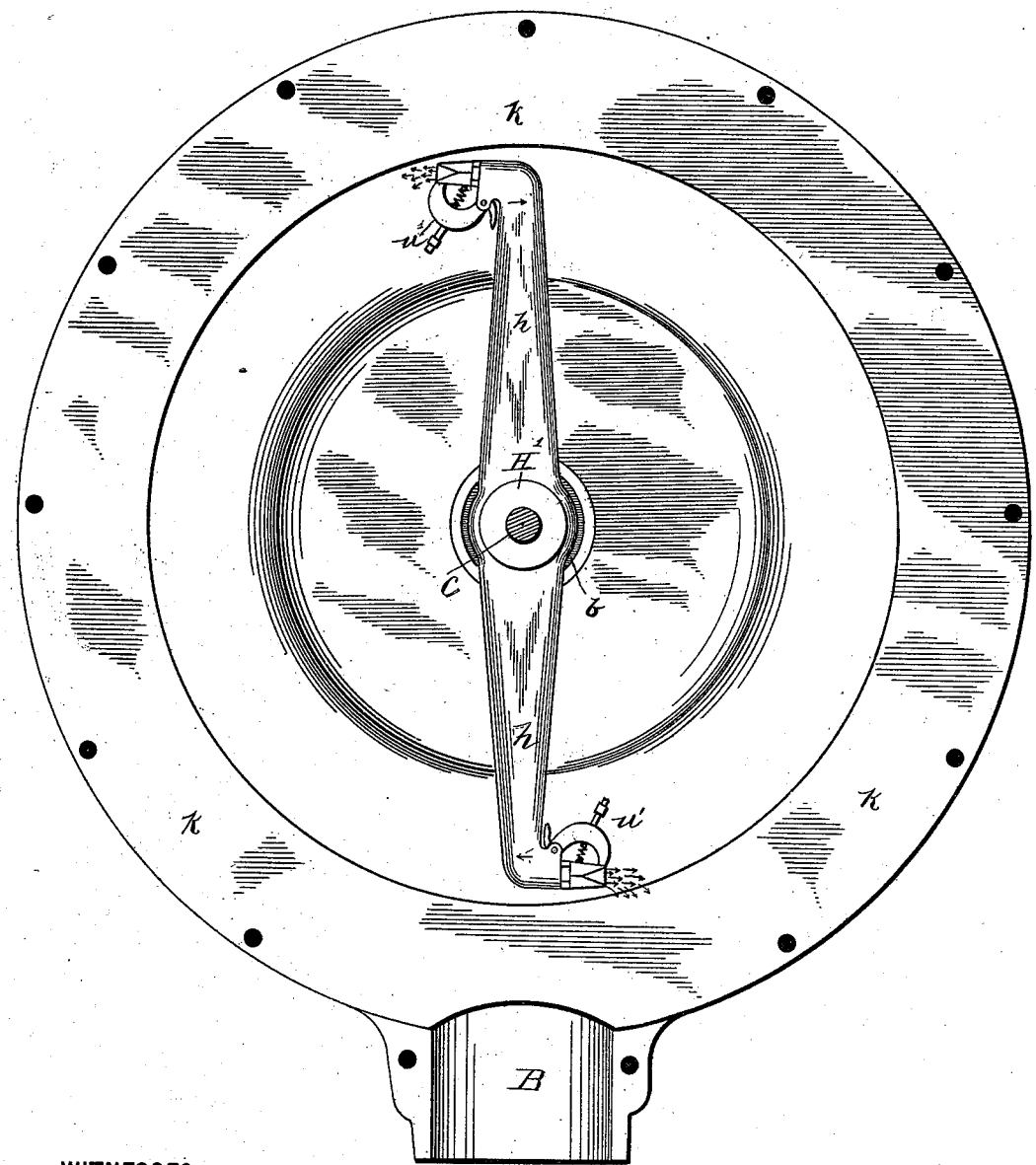
Figures 12, 13:
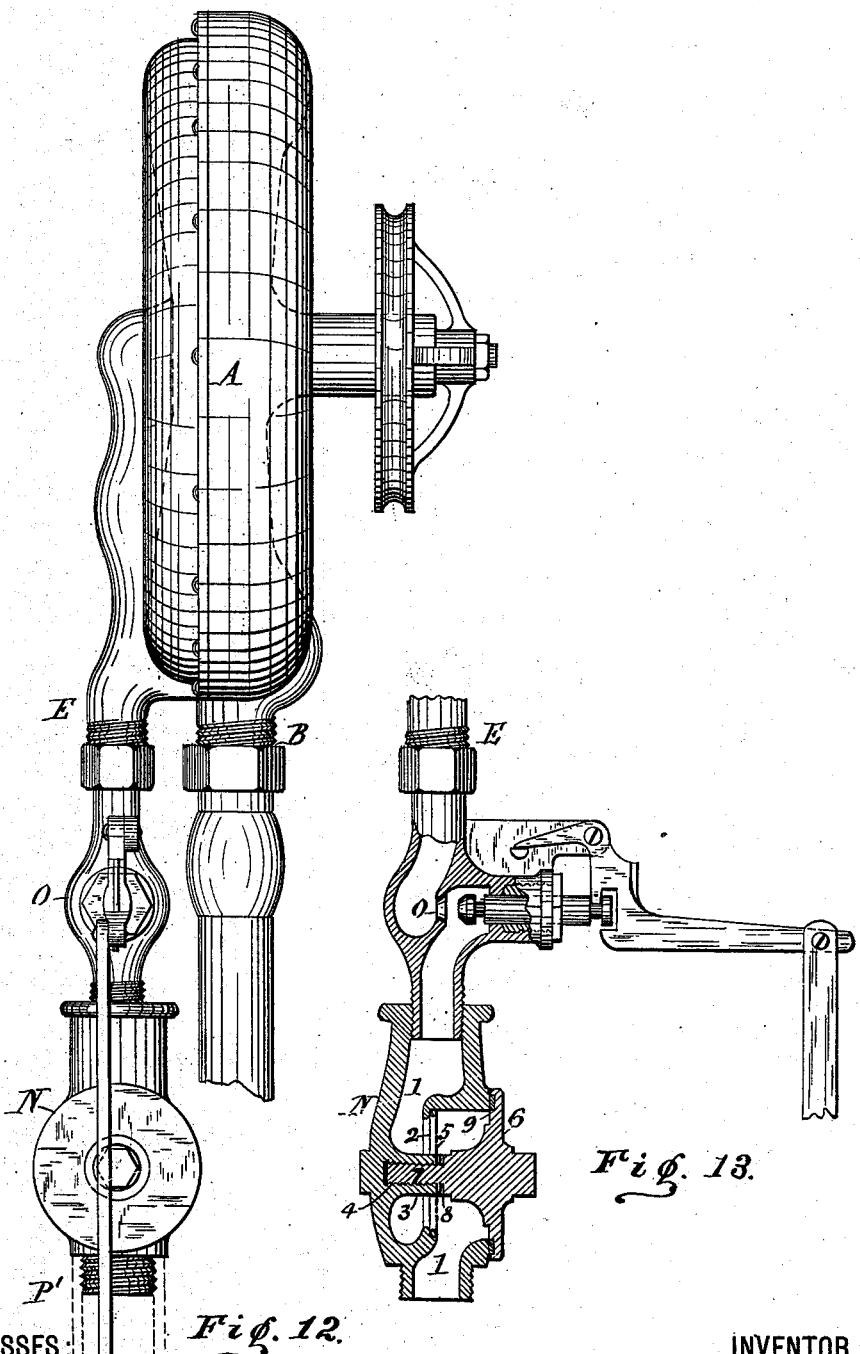

Figures 1 and 2 are external views of my improved water-motor, taken in planes at right angles to each other. Fig. 3 is a transverse section taken on line $x\,x$, Fig. 1, illustrating the interior construction of the motor and the relative arrangement of the parts. Fig. 4 illustrates an interior view of one side of the annular case, the case of the water-motor being parted on the line $y\,y$, Fig. 2, and the driving-shaft of the motor being in section. This view illustrates the exterior construction of the water-wheel and the automatic valve for regulating the flow of water through the arms of the wheel, and also the arrangement of the water-shields on the interior of the case of the motor. Figs. 5, 6, 7, and 9 are longitudinal sectional views of the discharge end of the radial water-carrying arms with the automatic controlling-valve attached thereto, and illustrating various modifications in the construction and combination of said parts. Figs. 8 and 10 are face views of the devices shown in Figs. 7 and 9. Fig. 11 is a side view of the discharge end of a radial water-carrying arm, illustrating a further modification in the construction of said parts. Figs. 12 and 13, respectively, are side and sectional views of the attachment of the strainer to the induction-pipe of the motor.

A represents the case of the motor, the said case being of annular or approximately annular shape, and preferably composed of two parts joined to each other in a plane in the center of the case at right angles to the axis thereof. It is to be secured in upright position or with its axis horizontally, and is provided with the water-inlet $a$ in the center of one side and with the water-discharge nipple B at its bottom portion.

C denotes the driving-shaft, which is extended through one side of the case, and is connected at its inner end to the hub H' of the water-wheel on the interior of the case. The driving-shaft C is provided with a collar, $c$, against which the hub H' of the water-wheel bears, and the shaft C turns in a plug, $d$, which fits within the sleeve $e$ and abuts against the reduced portion $c'$ of the collar $c$. The said plug $d$ terminating on its outer extremity with the nut $n$, which screws into the sleeve $e$, as best shown in Fig. 3, forms an adjustable journal-box within the bearing D, and permits collar $c$ to be pressed against the adjacent hub of the wheel and the opposite hub to be pressed up snugly against the ductor-block $b$ for the purpose of adjustment. The sleeve $e$ is inserted within the bearing D and Babbitt metal, $g$, poured in, which secures the sleeve $e$ firmly within the bearing D. A lubricator, L, is attached to the bearing D, and an annular groove, L', is provided in the sleeve $e$, and orifices $o\,o$, for the passage of the lubricant to the shaft C, are provided, and serve to freely lubricate the shaft C.

The driving-wheel of the motor consists of the hubs H H', the side H of which is hollow, and has a water-induction port, $i$, in the center of its side facing the water-inlet $a$ of the case A, and the hollow water-conducting arms or spokes $h\ h$, extending radially from the aforesaid hub. The free ends or discharge-nozzles of the arms are deflected laterally in relation to the axis of the wheel or driving-shaft C, and also laterally with relation to the plane of rotation of the arms—that is, toward one side of the case A. The water entering the induction-port $i$ of the hub H' passes out toward the free ends of the arms $h$, and in its discharge from the latter it exerts the necessary power on the wheel to impart rotary motion thereto. The interior of the hollow arms $h$, I taper from the hub to the free ends of the arms, and thereby reduce the quantity of water carried in the free ends of the arms.

It will be observed that in order to properly support the water-wheel and make it run steady under the great speed which it necessarily attains, and at the same time to relieve the driving-shaft C from undue strain, I provide the annular ductor-block $b$, which is inserted in the shell A immediately in front of the water-inlet $a$, and construct the said annular ductor-block $b$ so that the projecting exterior of the hollow hub H fits snugly within the annular ductor-block, as best shown in Fig. 3, and the water from the inlet $a$ passes through the passage $i$ in the ductor-block $b$ into the hollow hub H, and from thence into the hollow arms $h$, as previously explained.

On the free extremities of the hollow spokes or water-conducting arms $h\ h$ of the water-wheel I provide valves for automatically controlling the flow of the water; and the same consists, essentially, of a valve arranged to open and close the discharge-nozzles of the water-conducting arms, and is actuated by the centrifugal force exerted at the free ends of the said arms. As the speed of the wheel increases and centrifugal force is exerted, the valve $t$ closes gradually and shuts off the flow of water. As the speed diminishes, the valve opens and allows the free passage of the water, as in starting the motor.

The centrifugal governing devices of the aforesaid valve are susceptible of many modifications in their construction, as illustrated in Figs. 5 to 11, inclusive; hence I do not restrict myself to any specific form of construction for this purpose.

In the device shown in Figs. 5 and 6 of the drawings the valve $t$ is formed on one end of the weighted lever $u'$, pivoted in a case, $w$, formed on the end of the arm $h$, the said lever being held normally in a position to open the nozzle of the arm $h$ by means of the spring $v$ pressing on the weighted end of the lever.

Figs. 7 and 8 show the valve-governing device to consist of the curved weighted lever $u'$, pivoted to the exterior of the nozzle, and the valve $t$, pivoted on the aforesaid lever and lying in the nozzle in such position as to close said nozzle automatically with the swinging outward of the lever $u'$ when subjected to the centrifugal force of the arm $h$, the valve $t$ being held normally in an open position by means of two springs, $v\ v'$, one of which is arranged to crowd the lever inward toward the axis of the wheel, and the other spring draws the valve toward the lever.

In Fig. 13 of the drawings the valve $t$ consists of a piston, $t'$, arranged inside of the nozzle and in range with the axis thereof. The rear end of the piston $t'$ is connected with one of the arms of the bell-crank N', which is pivoted to a suitable support on the exterior of the arm $h$ and $h$, as the weight $v^2$ connected to its other arm. A spiral spring, $v$, surrounding the piston $t'$ between the aforesaid box and the arm of the bell-crank N', pushes the piston $t'$ in a direction to normally hold it withdrawn from the nozzle of the arm $h$. The centrifugal force exerted on the arm $h$ when in motion causes the weighted bell-crank N' to force the piston $t'$ toward the nozzle of the arm, and thus close the same to a greater or less degree, according to the velocity of the rotation of the arm $h$.

At Fig. 11 I have illustrated a modification in which the valve $t$ is connected to the curved lever $u'$, between which and the nozzle is placed the spiral spring V, actuating to press outward the lever and normally hold the valve open. As the arms $h$ of the water-wheel rotate, the water passing from the said arm is thrown out against the shell of the case A, and in order to prevent the discharge of the water from obstructing the movement of the wheel in the case A, I attach to the inner side of the case toward which the discharge-nozzles of the arms $h\ h$ are deflected, an annular plate, $j$, which is inclined with its free edge toward the aforesaid arms sufficiently to form between said plate and the adjacent side of the case an annular water passage or duct, I, for collecting the water issuing from the discharge-nozzles of the arms $h\ h$, and to the peripheral portion of the interior of the case I secure a shield, $k$, the inner edge of which projects toward the mouth of the nozzles of the aforesaid arms so as to shed over into the duct I such of the water as may be spattered above the nozzles. It will be observed that by the aforesaid shield and plate $k$ and $j$, I form in the case a separate compartment from which the water is excluded, and in which the wheel rotates and is free from impediments.

In order to prevent grit and other impurities from entering the water-induction pipe, and thus cause undue wear and clogging of the parts, I provide a strainer which is constructed so as to be attached to the water-pipe of the motor, so as to render it accessible for cleaning without necessitating the uncoupling of the pipe. To attain this object I connect to the water-pipe P', and preferably to the section of said pipe nearest the motor, a case, N, as shown in Figs. 12 and 13 of the drawings, the said case having water-passages 1 1, Fig. 13, through it, and a lateral offset and an intermediate port, 2, through which the aforesaid passages communicate with each other. From one side of the interior projects a hub, 3, into the port 2, and this hub is provided with a screw-threaded axial socket, 4. The diaphragm or strainer 5 spans the port 2, and is seated upon the end of the hub 3. The strainer is thus mounted in a vertical position, and by reason thereof the clogging up of the strainer by collection of impurities upon its face is to a great extent prevented.

The side of the case facing the end of the hub 3 is provided with an opening, 9, and to this is closely fitted a cover or cap, 6, having a screw-threaded stem, 7, which screws into the socket 4 and secures the said cap in its closed position on the case. The cap is also provided with a shoulder, 8, by which it bears on the portion of the strainer 5 resting on the hub 3, said strainer being thus retained in its position, and is rendered accessible and removable by unscrewing the cap 6 from the case N.

O denotes the throttle-valve of the motor, and in order to protect the said valve from wear and clogging by grit and dirt entering the motor with the water I interpose the said valve between the strainer-case N and the motor, as shown in Fig. 12 of the drawings.

The annular ductor-block b, in addition to serving as a bearing for the hollow hub H, also serves to prevent the water from entering that portion of the case into which the water-conducting arms of the motor-wheel move, and to accomplish this desirable purpose it is essential that the hollow hub H should fit closely within the annular ductor-block b, as best illustrated in Fig. 3. By this construction it will be observed that the water is excluded from that portion of the case in which the arms move, and the discharge from the nozzles is thrown between the shield and plate j, and great ease in running is thereby secured.

My improved motor is simple in construction, very effective and durable, and also very economical in the use of water, owing to the action of the centrifugal governing devices.

Having thus fully described my invention, what I claim as new, and desire to secure by Letters Patent, is—

1. A case for a water-motor, provided on its interior with an annular inclined plate forming a water passage or duct at one side of the case, and with a peripheral shield the inner edge of which projects toward said plate, so that water thrown on said shield will be directed into said duct, substantially as described.

2. In a water-motor, the combination, with the case and rotary hollow hub and radial arms, of an annular ductor-block fitted in the open side of the case between it and the open hub for directing the water thereto and preventing it from entering the portion of the case in which said arms move, substantially as described.

3. In a water-motor, the combination, with the case and rotary hollow radial water-conducting arms, of an annular ductor-block in the case at the inlet sides of the said arms, and an annular shield projecting from the peripheral portion of the interior of the case toward the path of the discharge ends of the aforesaid arms, substantially as and for the purpose set forth.

4. In a water-motor, the combination, with the rotary hollow water-conducting arm, of a discharge-nozzle on the free end of said arm and deflected laterally therefrom, a valve in the said nozzle, a lever hinged on the aforesaid arm and carrying the valve, and a spring connected with said lever and arranged to normally sustain the valve in its open position, substantially as described and shown.

5. The combination of the case N, provided with the water-passages 1 1, intermediate port, 2, hub 3, projecting into said port and provided with the screw-threaded socket 4 and opening 9 in the side of the case, the strainer 5, spanning the port 2 and seated upon the hub 3, and the cap 6, having the screw-threaded stem 7 entering the socket 4, and having also the shoulder 8, bearing on the portion of the strainer resting on the hub, substantially as described and shown.

In testimony whereof I have hereunto signed my name and affixed my seal, in the presence of two attesting witnesses, at Syracuse, in the county of Onondaga, in the State of New York, this 6th day of January, 1887.

FREDERICK W. TUERK, Jr. [L. S.]

Witnesses:
H. P. DENISON,
C. BENDIXON.